United States Patent Office 3,592,796
Patented July 13, 1971

3,592,796
LINEAR POLYESTER POLYMERS CONTAINING ALKALI METAL SALTS OF SULFONATED ALIPHATIC COMPOUNDS
Louis E. Trapasso, Westfield, and Robert W. Stackman, Morris Township, Morris County, N.J., assignors to Celanese Corporation of America, New York, N.Y.
No Drawing. Continuation of application Ser. No. 502,520, Oct. 22, 1965. This application Mar. 10, 1969, Ser. No. 809,468
Int. Cl. C08g 39/04, 53/14
U.S. Cl. 260—75    4 Claims

ABSTRACT OF THE DISCLOSURE

A mixture of a linear terephthalate polyester polymer and minor amounts of a metallized compound having the formula:

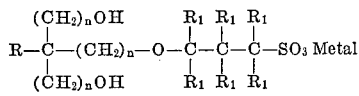

wherein
(a) R represents a member selected from the group consisting of hydrogen and an alkyl radical containing from 1 to 6 carbon atoms,
(b) $R_1$, individually, represents a member selected from the group consisting of hydrogen and an alkyl radical containing from 1 to 6 carbon atoms, and
(c) each $n$ represents an integer from 0 to 3.

This invention which is a continuation of copending application Ser. No. 502,520, filed Oct. 22, 1965, now abandoned, relates to novel aliphatic sulfonates, the process for preparing same mixtures of said aromatic sulfonates with linear thermoplastic polymers and shaped articles produced therefrom. More particularly, the invention is directed to the preparation of novel aliphatic sulfonates capable of being dissolved in linear thermoplastic polymers which in turn can be shaped into articles such as films, fibers, and the like, having an affinity for basic type dyes.

Successful methods have been suggested in the past to improve the dyeability of shaped articles made from synthetic polymers such as fibers, fabrics or films specially utilizing basic dyes to provide brighter colors and also to permit cross dyeing of the articles. These methods utilize the techniques of incorporating sulfonated monomers into synthetic polymers such as polyester, nylon, polypropylene and the like to provide copolymers. Typical of this procedure is U.S. 3,018,272 which describes the process of producing basic dyeable polyesters having incorporated therein as copolymers sulfonated monomers. In the prior art, the use of sulfonated monomers to form copolymers with polyester is considered essential in view of the known general insolubility of most sulfonated monomers. Under these conditions, if the insoluble sulfonated monomers are not formed as copolymers with polyesters, the resulting fibers and films formed from these heterogeneous mixtures do not provide uniform dyeing and the insoluble sulfonated monomer tends to bleed from the mixture.

Contrary to what is generally accepted in the prior art, a class of novel aliphatic sulfonated compounds has been discovered which when incorporated into synthetic linear polymers dissolve therein to form a mixture which in turn can be shaped into highly desirable fibers and films having permanent and uniform basic dye uptake sites throughout the shaped article.

The novel class of sulfonated aliphatic compounds of this invention can be represented by the following formula:

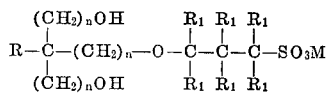

wherein R represents hydrogen or an alkyl radical containing from 1 to 6 carbon atoms, $R_1$, individually, represents a member of the group consisting of hydrogen or alkyl radicals containing from 1 to 6 carbon atoms; each $n$ represents an integer from 0 to 3 and M represents an alkali metal consisting of sodium, potassium or lithium. The preferred compound of this invention is 2,2-dimethylol-1-(3-sodium sulfopropoxy) butane.

The novel class of sulfonated aliphatic compounds of this invention can be prepared by the reaction of at least equimolar quantities of the alkanol type alcohols with sultones in the presence of alkali hydroxides at temperatures in the range from about 30° C. to about 150° C. to produce the class of aliphatic sulfonated compounds described heretofore. The trihydric type alcohols can be described using the following formula:

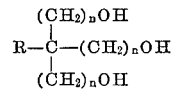

wherein R represents hydrogen or an alkyl radical containing from 1 to 6 carbon atoms and $n$ represents an integer from 0 to 3. Typical of the trihydric type alcohols include, among others, glycerine, trimethylol ethane, trimethylol propane, trimethylol butane, trimethylol hexane, triethanol ethane, triethanol propane, triethanol hexane, tripropanol ethane, tripropanol butane, tripropanol hexane and the like.

The sultones which are reacted with the trihydric type alcohols can be described generically in the following formula:

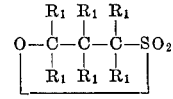

wherein $R_1$, individually, represents hydrogen or alkyl radicals containing from 1 to 6 carbon atoms. Suitable sultones include, among others: 1,3-propane sultone, 1,3-butane sultone, 1,3-isohexane sultone, 1,3-hexane sultone and the like.

The alkali hydroxides suitable for use in the process herein include sodium hydroxide, potassium hydroxide and lithium hydroxide. The alkali hydroxides are used in an excess of organic vehicle or medium such as benzene, toluene, ortho-xylene, meta-xylene, para-xylene, mixtures thereof and the like. The purpose of the inert organic vehicle is to provide azotropic distillation of the water produced in the reaction so that the water can be quickly removed to prevent the reaction from reversing.

The temperature conditions utilized in preparation of the novel aliphatic sulfonated compounds of this invention range from about 30° C. to about 150° C., preferably from 50° C. to 120° C. The reaction can be carried out at atmospheric pressure, superatmospheric pressures or subatmospheric pressures. The unique feature in the processing technique of the preparation of the sulfonated aliphatic compound of this invention relates to the fact that only one of the alcohol groups of the trihydric type alcohols reacts with the various alkali hydroxides utilized even though the alkali hydroxides are present in excess molar quantities to the starting alcohols. Subsequent reaction with sultones yields predominately the monosulfonated aliphatic compound.

The surprising feature of the sulfonated aliphatic compounds of this invention is the solubility of these compounds in synthetic linear polymers such as polyethylene terephthalate. It has also been unexpectedly discovered that the sulfonated aliphatic compounds of this invention do not in general, form copolymers when present in the overall polymerization of the synthetic linear polymers, especially polyethylene terephthalate, but remain essentially as homogeneous mixtures. The mixtures of the sulfonated aliphatic compounds of this invention and polymerized synthetic linear polymers are useful in the production of shaped articles by extrusion, molding, casting or the like. These shaped articles in turn may be formed into fibers (filaments and staple), fabrics, ornaments, films or the like.

The presence of the sulfonated aliphatic compounds in the synthetic linear polymers is to provide dye sites especially for basic dyes. It is usually desirable to use at least about 0.5 weight percent of the sulfonate salt based on the total. Polymer mixtures having a sulfonated salt content lower than 0.5 weight percent will usually have only a relative low affinity for basic dyes. Polymer mixtures containing about 10 weight percent of the sulfonated compound have a very high affinity for basic dyes. Higher concentrations will not lead to appreciable increases in the shaped articles. The sulfonated aliphatic compound basic dyeability and in general may unduly affect tenacity concentrations in the range from 2 to 5 weight percent of the total mixture, are preferred.

The term "linear thermoplastic polymer" as used herein include polymeric polymethylene terephthalates especially polyethylene terephthalate among others. Other polymers which can be included herein utilized herein are polyalkylene terephthalate containing modifiers such as dibasic acids including among others; isophthalic acid, sebacic acid, adipic acid and the like. Cyclic glycols can also be substituted for the alkylene glycols in the linear terephthalate polymers. Other polymers included herein are polyamides such as polyhexamethylene adipamide, polyhexamethylene sebacamide, polytetramethylene sebacamide, polytetramethylene adipamide and the like. Other polyamides include those prepared from di(4-amino-cyclohexyl) ethane or 1,6-(4-aminocyclohexyl) hexane as the diamine components. Additional polymers include polypropylene, polybutenes and the like. As is known, the intrinsic viscosities of the above-described polymers should be in excess of 0.2, preferably in the range from 0.4 to 1.0 when used for producing textile and industrial products.

Various other materials may be present in the reaction mixture. For example, such ester exchange catalysts as salts of calcium, magnesium, manganese and the like and such polymerization catalysts as antimony oxide, antimonic acid or the like, may be used. In addition, pigments, delusterants, or other additives such as titanium dioxide or barium carbonate.

The yarns or filaments produced in accordance with the present invention are suitable for the usual textile applications. They may be employed in the knitting or weaving of fabrics of all types as well as in the production of nonwoven, felt-like products produced by known methods. Their physical properties closely parallel those of their related non-modified polymer fibers. However, they have particular sensitivity toward basic dyes. By a "basic dye" is meant a colored cationic organic substance such as those containing sulfonium, oxonium or quaternary ammonium functional groups. Among the basic types which may be applied to the filaments formed in accordance with the present invention may be mentioned Victoria Green WB (C.I. 657); Thodamine B (C.I. 749); Brilliant Green B (C.I. 662); Victoria Pure Blue BO (Pr 198); Sevron Blue B; and the like. The dyes are preferably applied from an aqueous solution at a temperature between 80° and 125° C.

Filaments and films, i.e. shaped structures which have at least one dimension relatively very small and at least one dimension relatively large, are the preferred structures of the present invention. Such structures of the polymer mixtures of this invention are permeated uniformly throughout by basic dyes applied from hot aqueous solution. The penetration of dyes is an important characteristic since poor resistance of fading and loss of color through rubbing or abrasion is a known characteristic of structures which retain dye only at their surfaces.

The following examples will serve to illustrate the invention:

EXAMPLE I

To a one liter three-necked flask equipped with a mechanical stirrer, thermometer and Dean-Stark trap is added 134 grams (1.0 mole) of trimethylol propane, 115 milliliters xylene and 115 milliliters toluene. To the solution in the reaction flask was added a solution of 41.2 grams (1.0 mole) of 97 percent sodium hydroxide in 40.0 milliliters distilled water. The rapidly stirred mixture was heated to reflux and the theoretical amount of water was collected in 3.5 hours. The initial pot temperature was 111° C. and the final pot temperature was 122° C. To the cooled suspension of the monosodium alkoxide of trimethylol propane in xylene-toluene was added a solution of 122 grams of 1,3-propane sultone in toluene. The mixture was heated to about 65° C. and an exothermic reaction took place. The reaction mixture was allowed to stand for three days. The solid product 2,2-dimethylol-1-(3-sodium sulfopropoxy) butane was collected by filtration, washed with ethanol and dried in a vacuum oven at 80° C. overnight. The product weighed 184 grams and had a melting point of 152–155° C. Infra-red analysis confirm the structure of 2,2-dimethylol-1-(3-sodium sulfopropoxy) butane.

In a similar manner as the above example, glycerine, triethanol propane and tripropanol hexane can be substituted for trimethylol propane while 1,3-butane sultone and 1,3-isohexane sultone can be substituted for 1,3-propane sultone.

EXAMPLE II

To a 500 ml. three-necked flask equipped with stirrer, nitrogen inlet and distillation head are added 5.56 grams of 2,2-dimethylol-1-(3-sodium sulfopropoxy) butane dissolved in 20 milliliters of ethylene glycol, 0.14 gram antimonic acid and 200 grams of bis(2-hydroxyethyl) terephthalate. The flask was flushed three times with nitrogen, then heated to 227° C. at which temperatrue all the material had melted to form a clear solution. The temperature was increased slowly over a period of one hour to 270° C. The pressure was then slowly lowered by means of a vacuum pump to 0.10 mm. Hg pressure while the temperature was increased to 290° C. The polymerizing mixture was stirred at 290° C. and 0.10 mm. Hg pressure for one hour. At the end of this period, the vacuum was released and the polymer allowed to cool. The recovered polymer had an intrinsic viscosity of 0.47 determined in a mixture of 10 parts phenol and 7 parts trichlorophenol and a crystalline melting point of 242° C. The polymer mixture contained polyethylene terephthalate and 2,2-dimethylol-1-(3-sodium sulfopropoxy) butane. A portion of the polymer was placed in chloracetic acid wherein approximately 98 percent of the 2,2-dimethylol-1-(3-sodium sulfopropoxy) butane was removed in two extractions. This indicates that the polymer product is a mixture of polyester polymer and the sulfonated aliphatic product and not a copolymer.

The polymer was spun into fibers at 285° C. from a melt index apparatus and the fibers obtained oriented by stretching at least 3 times the spun yarn over a surface heated at 80° C. A sample of the oriented fiber was dyed in a Sevron Blue B basic dye bath for one hour at 95° C. The fibers dyes to a deep shade of blue having good washfastness properties.

In a similar manner as above polyhexamethylene adipamide can be substituted for the polyethylene terephthalate.

It is understood that the foregoing description is merely illustrative of preferred embodiments of the invention of which many variations may be made by those skilled in the art within the scope of the following claims without departing from the spirit thereof.

What is claimed is:

1. A composition comprising a linear fiber and film-forming terephthalate polyester polymer, and from about 0.5% by weight to about 10% by weight based on the total composition of a sulfonated salt having the formula:

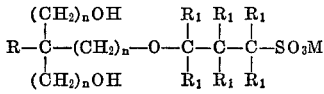

wherein
 (a) R represents a member selected from the group consisting of hydrogen and an alkyl radical containing from 1 to 6 carbon atoms,
 (b) $R_1$, individually, represents a member selected from the group consisting of hydrogen and any alkyl radical containing from 1 to 6 carbon atoms,
 (c) each $n$ represents an integer from 0 to 3,
 (d) M represents an alkali metal selected from the group consisting of sodium, potassium and lithium.

2. The composition of claim 1 wherein said polyester polymer is polyethylene terephthalate and said sulfornated salt is 2,2-dimethylol-1-(3-sodium sulfopropoxy)-butane.

3. The composition of claim 1 wherein said sulfonated salt is 2,2-dimethylol-1-(3-sodium sulfopropoxy)-butane in amounts ranging from about 2 weight percentage to about 5 weight percentage based on the total composition.

4. The composition of claim 1 in the form of a fiber or film wherein said polyester polymer is polyethylene terephthalate and said sulfornated salt is 2,2-dimethylol-1-(3-sodium sulfopropoxy)-butane present in amounts ranging from about 2 weight percentage to about 5 weight percentage based on the total composition.

References Cited
UNITED STATES PATENTS

| | | | |
|---|---|---|---|
| 3,018,272 | 1/1962 | Griffing | 260—75(S) |
| 3,432,472 | 3/1969 | Caldwell | 260—75(S) |

WILLIAM H. SHORT, Primary Examiner

L. P. QUAST, Assistant Examiner

U.S. Cl. X.R.

8—4, 165, 173, 179; 260—30.8, 327, 513